US012530423B1

United States Patent
Ananth et al.

(10) Patent No.: US 12,530,423 B1
(45) Date of Patent: Jan. 20, 2026

(54) SYSTEMS AND METHODS FOR PERFORMING DISCRETE AND FAST FOURIER TRANSFORMS

(71) Applicant: Apple Inc., Cupertino, CA (US)

(72) Inventors: Vinod Ananth, Sunnyvale, CA (US); Mohanned Omar Sinnokrot, San Diego, CA (US)

(73) Assignee: Apple Inc., Cupertino, CA (US)

( * ) Notice: Subject to any disclaimer, the term of this patent is extended or adjusted under 35 U.S.C. 154(b) by 1125 days.

(21) Appl. No.: 17/448,868

(22) Filed: Sep. 24, 2021

(51) Int. Cl.
*G06F 17/14* (2006.01)
*G06F 7/544* (2006.01)

(52) U.S. Cl.
CPC .......... *G06F 17/142* (2013.01); *G06F 7/5443* (2013.01)

(58) Field of Classification Search
CPC .. G06F 17/141; G06F 17/142; G06F 15/7867; H04L 27/2651
See application file for complete search history.

(56) References Cited

U.S. PATENT DOCUMENTS

| | | | |
|---|---|---|---|
| 7,395,293 B1* | 7/2008 | Szedo | G06F 17/142 708/404 |
| 2008/0126462 A1* | 5/2008 | Xu | G06F 17/142 708/405 |
| 2014/0280420 A1* | 9/2014 | Khan | G06F 9/3897 708/404 |
| 2017/0220523 A1 | 8/2017 | Nekuii et al. | |
| 2019/0121614 A1 | 4/2019 | Langhammer | |
| 2019/0340020 A1 | 11/2019 | Brewer | |

FOREIGN PATENT DOCUMENTS

EP  0 080 266 A2  1/1983

OTHER PUBLICATIONS

Yang, et al., Power and Area Minimization of Reconfigurable FFT Processors: A 3GPP-LTE Example, IEEE Journal of Solid-State Circuits, vol. 47, No. 3, Mar. 2012.*

* cited by examiner

*Primary Examiner* — Andrew Caldwell
(74) *Attorney, Agent, or Firm* — Kilpatrick Townsend & Stockton LLP

(57) ABSTRACT

Reconfigurable digital logic circuits and methods of operation can be used to accelerate computation of Fast Fourier Transforms (FFT) and discrete Fourier transforms (DFT) for a range of sizes. In some embodiments, the same circuit can be reconfigurable to support FFT of any size $2^k$ (for positive integer k) and DFT for of any size $2^a*3^b*5^c$ for non-negative integers a, b, c.

20 Claims, 9 Drawing Sheets

| SIZE (N) | # ITER | RADIX | SDF RADIX | DFT RADIX | RADIX-P |
|---|---|---|---|---|---|
| 128 | 1 | 16 | 2×2 | 4 | - |
|  |  | 8 | - | - | 8 |
| 256 | 2 | 4 | bypass | 4 | - |
|  |  | 8 | 2 | 4 | - |
|  |  | 8 | - | - | 8 |
| 1200 | 3 | 5 | bypass | 5 | - |
|  |  | 5 | bypass | 5 | - |
|  |  | 6 | 2 | 3 | - |
|  |  | 8 | - | - | 8 |
| 1536 | 2 | 12 | 2×2 | 3 | - |
|  |  | 16 | 2×2 | 4 | - |
|  |  | 8 | - | - | 8 |

FIG. 8

SYSTEMS AND METHODS FOR PERFORMING DISCRETE AND FAST FOURIER TRANSFORMS

BACKGROUND

This disclosure relates to digital logic circuits and in particular to systems and methods for performing discrete Fourier transforms and Fast Fourier transforms in digital logic circuits.

The discrete Fourier transform (DFT) is a well-known mathematical operation that is fundamental to digital signal processing (DSP). For example, in the context of wireless data transmission (e.g., cellular data transmission in 4G and 5G networks), data to be transmitted is encoded and operated upon in the frequency domain to incorporate error detection and correction. The frequency-domain data is ultimately converted to time-domain using an inverse DFT and mixed onto the carrier signal for transmission. In order to extract the data, a receiver removes the carrier signal and converts back to frequency domain using a DFT. DFT has numerous other applications in cellular communication, including DFT-based precoding, channel estimation, and cell search. The Fast Fourier Transform (FFT) is a well-known algorithm that significantly accelerates computation of a DFT (and its inverse). Using a cascaded sequence of "butterfly" operations on pairs of inputs, the FFT can speed up computation of DFT from $O(N^2)$ to $O(N \log_2 N)$ in instances where the size of the transform (N) is a power of two. In some DSP applications, achieving high data rates (e.g., for 5G networks) can involve performing an FFT (or other DFT) having a large size (e.g., up to 4096 samples), and different applications of FFT (or other DFT) within the same DSP system may involve FFT (or other DFT) of different sizes. The ability to perform such transforms efficiently is therefore desirable.

SUMMARY

Described herein are various examples, or embodiments, of reconfigurable digital logic circuits and methods of operation that can be used to accelerate computation of FFT and DFT for a range of sizes. In some embodiments, the same circuit can be reconfigurable to support FFT of any size $2^k$ (for positive integer k) and DFT for of any size $2^a*3^b*5^c$ for non-negative integers a, b, c.

Some embodiments relate to a circuit that can include a number (P) of multimode radix processing chains, where P is at least 2, a radix-P engine, a memory, an output routing switch, an input routing switch, and control logic. The multimode radix processing chains can include one or more single-delay feedback (SDF) circuits connected in series and a multi-radix discrete Fourier transform (DFT) circuit connected in series with the one or more SDF circuits, such that the multimode radix processing chains have an input path and an output path. The radix-P engine can be configured to perform a radix-P DFT computation on a set of P samples received in parallel from the P multimode radix processing chains. The output routing switch can be coupled to the output path of the multimode radix processing chains, the radix-P engine, and the memory, and the output routing switch can be configured to selectably deliver output samples from the output path of the multimode radix processing chains to either the radix-P engine or the memory. The input routing switch can be coupled to the memory, an external data source, and the input path of the multimode radix processing chains, and the input routing switch can be configured to selectably deliver input samples from either the memory or the external data source to the multimode radix processing chains. The control logic can be coupled to the multimode radix processing chains, the memory, the output routing switch, and the input routing switch. The control logic can be configured to receive a input signal indicating a size of a transform to be computed and to control operation of the multimode radix processing chains, the radix-P engine, the output routing switch, and the input routing switch to compute the transform. In some embodiments, the multi-radix DFT circuit can be connected in series after the last SDF circuit in the multimode radix processing chain.

In some embodiments, the multi-radix DFT circuit can be a reconfigurable circuit that supports DFT computations for multiple radices, including, e.g., radix-3, radix-4, and radix-5. In some embodiments, the multi-radix DFT circuit can include a number of twiddle selectors, a set of multiplier circuits, a set of accumulators, and an output selector. The twiddle selectors can be configured to select a twiddle factor for a DFT computation, where the selection of the twiddle factor is based on a selected radix for the multi-radix DFT circuit and a sample number. The multiplier circuits can be coupled to different ones of the plurality of twiddle selectors and to an input path that provides either a real part or an imaginary part of an input data sample per clock cycle. The accumulators can be coupled to the plurality of multiplier circuits and configured to accumulate a sum representing either a real part or an imaginary part of one transformed sample. The output selector can be coupled to the accumulators and configured to output the real part and the imaginary part of a different one of the transformed samples per clock cycle.

In some embodiments, the multimode radix processing chains can include at least two SDF circuits connected in series.

In some embodiments, the memory can be a dedicated memory bank that is not shared with any other circuit.

Some embodiments relate to a microprocessor having a digital signal processing pipeline that includes a reconfigurable DFT/FFT circuit. The reconfigurable DFT/FFT circuit can include a number (P) of multimode radix processing chains, where P is at least 2, a radix-P engine, a memory, an output routing switch, an input routing switch, and control logic. The multimode radix processing chains can include one or more SDF circuits connected in series and a multi-radix DFT circuit connected in series with the one or more SDF circuits, such that the multimode radix processing chains have an input path and an output path. The radix-P engine can be configured to perform a radix-P DFT computation on a set of P samples received in parallel from the P multimode radix processing chains. The output routing switch can be coupled to the output path of the multimode radix processing chains, the radix-P engine, and the memory, and the output routing switch can be configured to selectably deliver output samples from the output path of the multimode radix processing chains to either the radix-P engine or the memory. The input routing switch can be coupled to the memory, an external data source, and the input path of the multimode radix processing chains, and the input routing switch can be configured to selectably deliver input samples from either the memory or the external data source to the multimode radix processing chains. The control logic can be coupled to the multimode radix processing chains, the memory, the output routing switch, and the input routing switch. The control logic can be configured to receive a input signal indicating a size of a transform to be computed and to control operation of the multimode radix processing chains, the radix-P engine, the output routing switch, and the input routing switch to compute the transform. In some embodiments, the multi-radix DFT circuit can be connected in series after the last SDF circuit in the multimode radix processing chain.

In some embodiments, the memory can be a memory bank within the reconfigurable DFT/FFT circuit. In some embodiments, the memory can be a shared memory that is accessible by the reconfigurable DFT/FFT circuit and by at least one other circuit in the digital signal processing pipeline.

In some embodiments, the multi-radix DFT circuit can be a reconfigurable circuit that supports DFT computations for multiple radices, including, e.g., radix-3, radix-4, and radix-5. In some embodiments, the multi-radix DFT circuit can include a number of twiddle selectors, a set of multiplier circuits, a set of accumulators, and an output selector. The twiddle selectors can be configured to select a twiddle factor for a DFT computation, where the selection of the twiddle factor is based on a selected radix for the multi-radix DFT circuit and a sample number. The multiplier circuits can be coupled to different ones of the plurality of twiddle selectors and to an input path that provides either a real part or an imaginary part of an input data sample per clock cycle. The accumulators can be coupled to the plurality of multiplier circuits and configured to accumulate a sum representing either a real part or an imaginary part of one transformed sample. The output selector can be coupled to the accumulators and configured to output the real part and the imaginary part of a different one of the transformed samples per clock cycle.

In some embodiments, the multimode radix processing chains can include at least two SDF circuits connected in series.

In some embodiments, the digital signal processing pipeline can be a SIMD pipeline having a number of data lanes, and the number P can be equal to the number of data lanes.

Some embodiments relate to a method of computing a discrete Fourier transform that can include providing a number (P) of input samples per clock cycle to a reconfigurable DFT/FFT circuit having a set of P multimode radix processing chains, wherein P is at least 2, the multimode radix processing chains including one or more SDF circuits and a multi-radix DFT circuit connected in series with the SDF circuits, wherein the multimode radix processing chains have an input path and an output path, the reconfigurable DFT/FFT circuit further having a radix-P engine configured to perform a radix-P DFT computation on a set of P samples received in parallel from the P multimode radix processing chains. The method can also include: determining, based at least in part on a size of the discrete Fourier transform, a number of iterations through the set of P multimode radix processing chains; determining, based at least in part on the size of the discrete Fourier transform, whether to bypass or activate individual ones of the SDF circuits in the multimode radix processing chains for each iteration; and determining, based at least in part on the size of the discrete Fourier transform, a radix for the multi-radix DFT circuits in the multimode radix processing chains for each iteration; generating control signals to perform the number of iterations through the set of P multimode radix processing chains, wherein generating the control signals includes generating a first subset of control signals to bypass or activate the SDF circuits in the multimode radix processing chains and generating a second subset of control signal to select the radix for the multi-radix DFT circuits; and during a last iteration of the number of iterations, providing output samples from the output paths of the multimode radix processing chain to the radix-P engine.

In some embodiments, the method can also include: during a first iteration of the number of iterations, providing a set of P input samples per clock cycle from an external data source to the input paths of the P multimode radix processing chains until a number of samples equal to the size of the discrete Fourier transform has been provided; during each iteration except the last iteration, routing samples from the output paths of the P multimode radix processing chains to a memory; and during each iteration except the first iteration, routing samples from the memory to the input paths of the P multimode radix processing chains.

In some embodiments, determining the number of iterations can be based on decomposing the size (N) of the discrete Fourier transform into a product of two or more radices such that a last radix in the product is equal to P and such that each other radix in the product is associated with one of the iterations. In some embodiments, determining whether to bypass or activate the SDF circuits in the multimode radix processing chains for a particular one of the iterations can be based on the radix associated with the particular one of the iterations. In some embodiments, determining the radix for the multi-radix DFT circuits in the multimode radix processing chains for a particular one of the iterations can be based on the radix associated with the particular one of the iterations.

In some embodiments, determining the number of iterations through the set of P multimode radix processing chains, determining whether to bypass or activate individual ones the SDF circuits in the multimode radix processing chains, and determining a radix for the multi-radix DFT circuits in the multimode radix processing chains can be performed using a lookup table that provides respective control signal settings for a plurality of different transform sizes.

The following detailed description, together with the accompanying drawings, will provide a better understanding of the nature and advantages of the claimed subject matter.

BRIEF DESCRIPTION OF THE DRAWINGS

FIG. 8 shows a table with examples of configuration information for a reconfigurable DFT circuit according to some embodiments.

DETAILED DESCRIPTION

The following description of exemplary embodiments is presented for the purpose of illustration and description. It is not intended to be exhaustive or to limit the claimed embodiments to the precise form described, and persons skilled in the art will appreciate that many modifications and variations are possible. The embodiments have been chosen and described in order to best explain their principles and practical applications to thereby enable others skilled in the art to best make and use various embodiments and with various modifications as are suited to the particular use contemplated.

Figure 1:
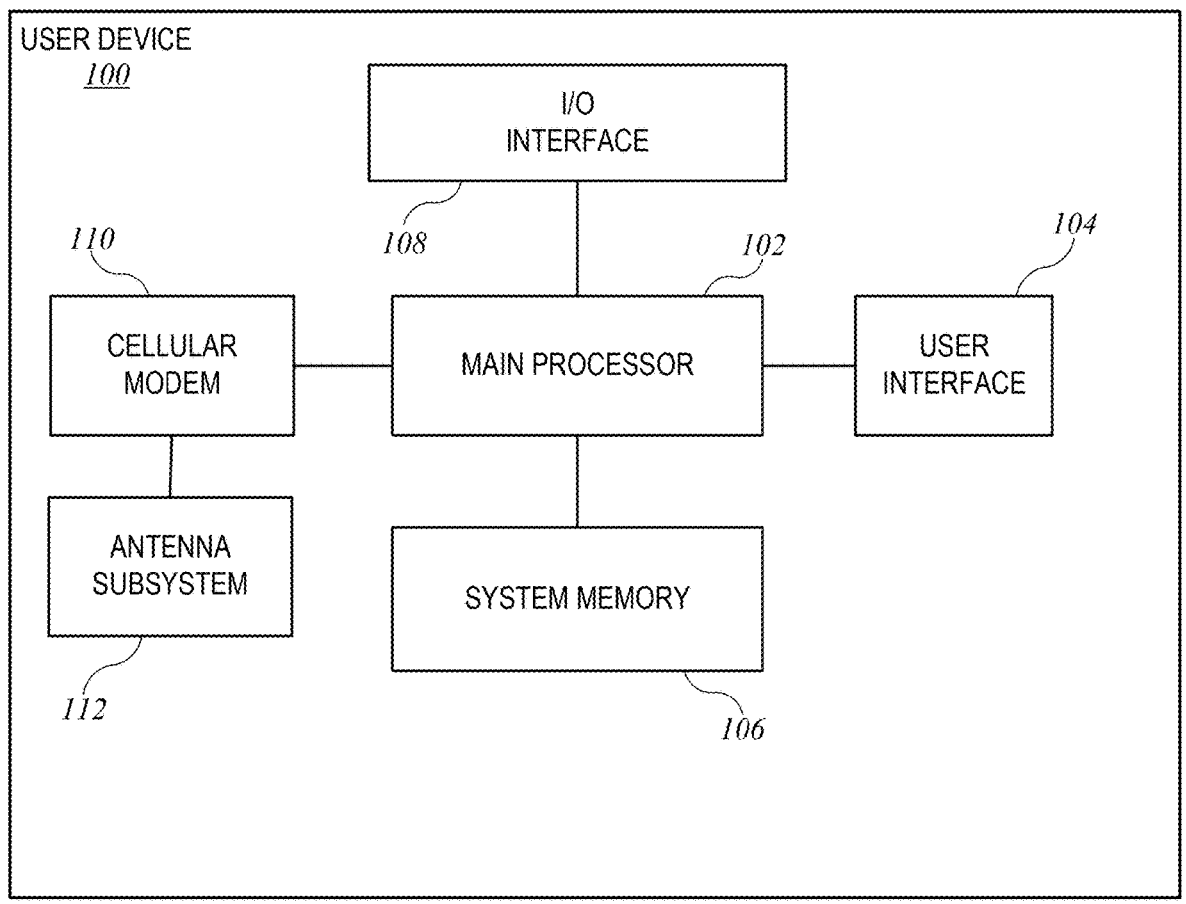
FIG. 1 is a simplified block diagram of a user device according to some embodiments.

FIG. 1 is a simplified block diagram of a user device 100 according to some embodiments. User device 100 can be, for example, a mobile device such as a smartphone, tablet computer, laptop computer, wearable device, or any other electronic device capable of operating as user equipment (UE) in a cellular radio access network. User device 100 is representative of a broad class of user-operable devices that may incorporate a cellular modem as described herein, and such devices can vary widely in capability, complexity, and form factor.

Main processor 102 can include, e.g., one or more single-core or multi-core microprocessors and/or microcontrollers executing program code to perform various functions associated with user device 100. For example, main processor 102 can execute an operating system and one or more application programs compatible with the operating system. In some instances, the program code may include instructions to send information to and/or receive information from other devices or systems, e.g., via a cellular data network such as a 4G or 5G network.

User interface 104 can include user-operable input components such as a touch pad, touch screen, scroll wheel, click wheel, dial, button, switch, keypad, keyboard, microphone, or the like, as well as output components such as a video screen, indicator lights, speakers, headphone jacks, haptic motors, or the like, together with supporting electronics (e.g., digital-to-analog or analog-to-digital converters, signal processors, or the like). Depending on the implementation of a particular user device 100, a user can operate input components of user interface 104 to invoke functionality of user device 100 and/or receive output from user device 100 via output components of user interface 104. In some embodiments, user device 100 may have a limited user interface (e.g., a small number of indicator lights and/or buttons) or no user interface.

System memory 106 can incorporate any type and combination of data storage media, including but not limited to random-access memory (e.g., DRAM, SRAM), flash memory, magnetic disk, optical storage media, or any other non-transitory storage medium, or a combination of media, and can include volatile and/or non-volatile media. System memory 106 can be used to store program code to be executed by main processor 102 and any other data or instructions that may be generated and/or used in the operation of user device 100.

Input/output (I/O) interface 108 can include hardware components and supporting software configured to allow user device 100 to communicate with other devices via point-to-point or local area network links. In some embodiments, I/O interface 108 can support short-range wireless communication (e.g., via Wi-Fi, Bluetooth, or other wireless transports) and can include appropriate transceiver and signal processing circuitry and software or firmware to control operation of the circuitry. Additionally or instead, in some embodiments, I/O interface 108 can support a wired connection to another device.

To enable communication via cellular networks, including cellular data communication, user device 100 can include a cellular modem 110 coupled to an antenna subsystem 112. Cellular modem 110 can be implemented as a microprocessor or microcontroller that acts as a co-processor to main processor 102. In some embodiments, cellular modem 110 and main processor 102 can be implemented as integrated circuits fabricated on a common substrate, e.g., as part of a system-on-a-chip design. In some embodiments, cellular modem 110 can support cellular data communication according to standards promulgated by the 3rd Generation Partnership Project (3GPP) to enable radio-frequency communication between a base station (typically implemented at a cellular antenna tower) and various user equipment (UE), which can include user device 100, via an "uplink" from the UE to the base station and a "downlink" from the base station to the UE. Standards promulgated by 3GPP include specifications for radio access networks (RANs), such as 4G Long-Term Evolution (referred to herein as "4G" or "LTE") and 5G New Radio (referred to herein as "5G" or "NR"). The 4G and 5G RAN specifications define multiple logical channels between the base station and the UE, including a physical uplink shared channel (PUSCH) and physical downlink shared channel (PDSCH) that transmit application-layer data, as well as a physical uplink control channel (PUCCH) and physical downlink control channel (PDCCH) that transmit control data used to specify various parameters associated with data transmission on the shared channels. At a high level, for any of these channels, data to be transmitted is encoded in the frequency domain, then transformed to time domain using an inverse Fast Fourier Transform (IFFT) for transmission on the radio channel; the receiver reverses the process by performing a Fast Fourier Transform (FFT) on the received time-domain signal, then decoding the data in the frequency domain. The particular encoding and decoding operations may differ from channel to channel and between 4G and 5G. It should be noted that data processing in all channels includes FFT or IFFT.

Embodiments of circuits and methods that can be used to implement FFT (and IFFT) are described below.

Antenna subsystem 112 can include an antenna, which can be implemented using a wire, metal traces, or any other structure capable of radiating radio-frequency (RF) electromagnetic fields and responding to RF electromagnetic fields at frequencies used in cellular data communication. For instance, 4G and 5G networks currently use various spectrum bands, including bands at 700 MHZ, 850 MHz, 900 MHZ, 1.5 GHZ, 1.8 GHZ, 2.1 GHZ, 2.5 GHz and 3.5 GHz. Antenna subsystem 112 can also include circuitry to drive the antenna and circuitry to generate digital signals in response to received RF signals. A particular antenna implementation is not critical to understanding the present disclosure, and those skilled in the art will know of numerous implementations. In some embodiments, antenna subsystem 112 can be shared between cellular modem 110 and I/O interface 108; for instance, the same antenna can be used to support any combination of cellular, Wi-Fi, and/or Bluetooth communications.

User device 100 can also include other components not shown in FIG. 1. For example, in various embodiments, user device 100 can include one or more data storage devices using fixed or removable storage media; a global positioning system (GPS) and/or other global navigation satellite system (GNSS) receiver; a camera; a microphone; a speaker; a power supply (e.g., a battery); power management circuitry; any number of environmental sensors (e.g., temperature sensor, pressure sensor, accelerometer, chemical sensor, optical sensor, etc.); and so on. Accordingly, user device 100 can provide a variety of functions, some or all of which may be enhanced by or reliant on cellular data communication supported by cellular modem 110.

Figure 2:
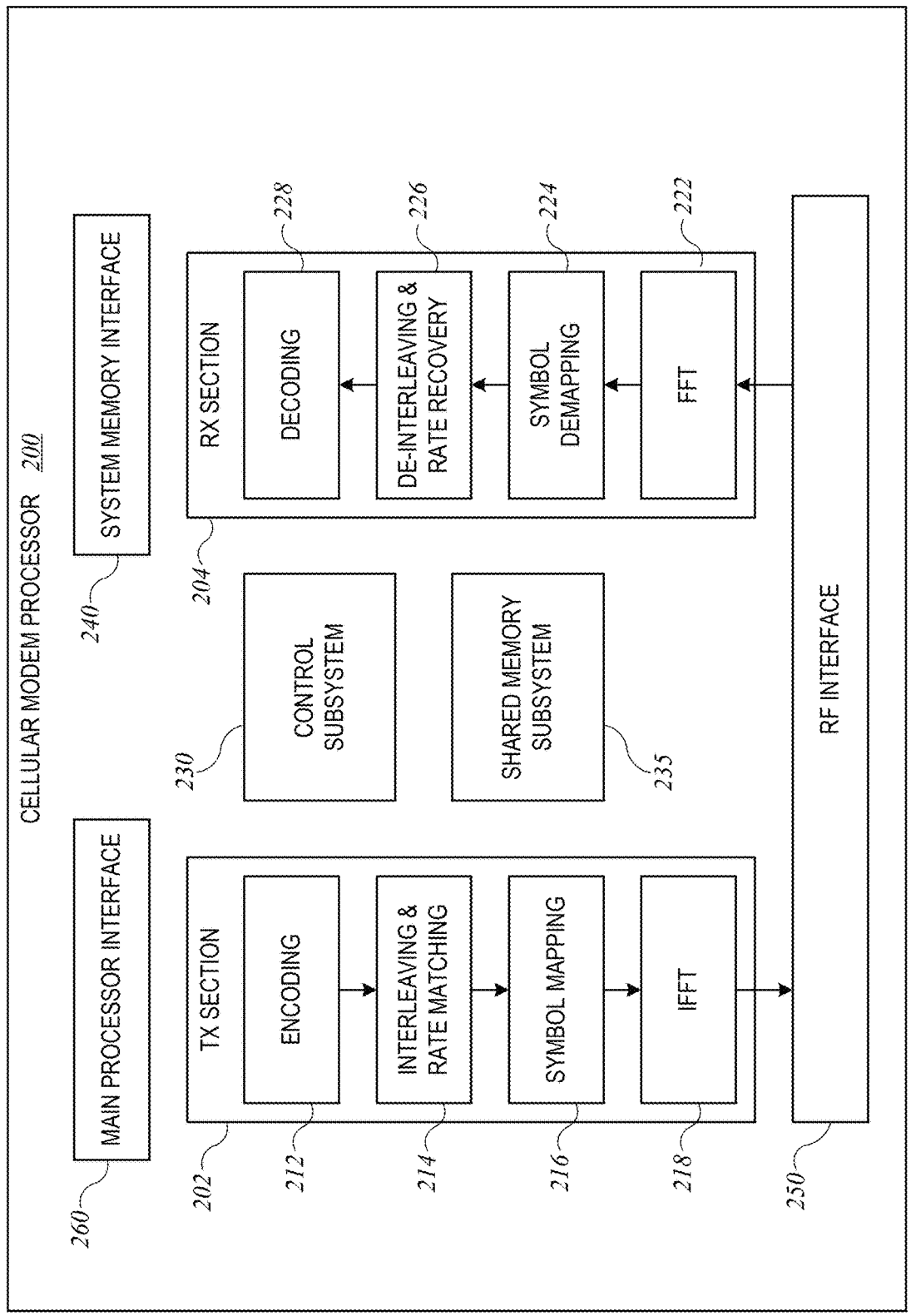
FIG. 2 is a simplified block diagram of a cellular modem processor according to some embodiments.

FIG. 2 is a simplified block diagram of a cellular modem processor 200 according to some embodiments. Cellular modem processor 200 can implement all or part of cellular modem 110 of FIG. 1. In various embodiments, cellular modem processor 200 can operate as user equipment (UE) in a cellular radio access network such as a 4G network and/or a 5G network.

Cellular modem processor 200 can include a transmit (TX) section 202 and a receive (RX) section 204. TX section 202 can include one or more data processing pipelines to prepare data for transmission via antenna subsystem 112, and RX section 204 can include one or more data processing pipelines to reconstruct transmitted data from signals received via antenna subsystem 112. Cellular modem processor 200 can also include a control subsystem 230, a shared memory subsystem 235 and various interfaces to other system components, such as a system memory interface 240, an RF interface 250, and a main processor interface 260.

Data processing pipelines in TX section 202 and RX section 204 can include logic circuitry (e.g., any combination of fixed-function and/or programmable circuitry) that implements a specific sequence of operations and associated storage circuitry (e.g., registers, data buffers, and/or other memory circuits) to store data being operated on. The operations can conform to the specifications of a particular cellular data network, including 4G and/or 5G networks. For example, shown in TX section 202 are an encoding unit 212, an interleaving and rate-matching unit 214, a symbol mapping unit 216, and an inverse Fast Fourier Transform (IFFT) unit 218. Encoding unit 212 can perform code block segmentation and channel coding for a particular channel (e.g., for PUCCH or PUSCH). The encoding operations can be specific to a particular channel and/or a particular communication standard. For instance, 4G PUSCH channel coding operations can include CRC (cyclic redundancy check) calculation and Turbo coding; 4G PUCCH channel coding operations can include CRC calculation and convolutional coding; 5G PUSCH channel coding operations can include CRC calculation and low-density parity check (LDPC) coding; and 5G PUCCH channel coding operations can include CRC calculation and polar coding. Interleaving and rate-matching unit 214 can perform interleaving and rate matching operations on encoded code blocks. As with encoding operations, interleaving and rate matching operations can depend on the particular channel and/or particular communication standard. For instance, in 4G PUSCH, interleaving precedes rate matching, while 5G PUSCH reverses the order. Symbol mapping unit 216 can receive bit sequences for code blocks after encoding, rate-matching and interleaving and can map the bit sequences onto symbols in an appropriate constellation for each of a set of orthogonal frequency division multiplexing (OFDM) subcarriers. Again, the mapping can depend on the particular channel and/or communication standard. Due to such differences, dedicated hardware pipelines can be constructed to support different physical channels (e.g., PUSCH vs. PUCCH) and/or different communication standards (e.g., 4G vs. 5G), or multipurpose pipelines that share hardware can be constructed. IFFT unit 218 receives the symbols from symbol mapping unit 216. Each symbol can be, e.g., a complex number representing an amplitude and phase. IFFT unit 218 can perform an IFFT to transform the symbols to a sample sequence in the time domain. This sample sequence can be provided to RF interface 250.

RF interface 250 can be an interface to antenna subsystem 112 of FIG. 1 and can convert the sample sequence to an analog signal that is mixed onto the carrier frequency and transmitted via an antenna. RF interface 250 can also down-convert received RF signals to baseband and convert the baseband analog signal to a sequence of digital samples. Digital sample sequences can be provided to pipelines in RX section 204.

As with TX section 202, operations in RX section 204 can conform to the specifications of a particular cellular data network, including 4G and/or 5G networks. For example, shown in RX section 204 are a Fast Fourier Transform (FFT) unit 222, a symbol demapping unit 224, a de-interleaving and rate recovery unit 226, and a decoding unit 228. FFT unit 222 can receive, via RF interface 250, a sequence of samples representing a received (baseband) signal and can perform an FFT to transform the samples from time domain to frequency domain. Symbol demapping unit 224 can perform demapping and symbol-decoding operations to generate a representation of the bits that were transmitted. The decoding operation can be a soft decoding operation that produces log likelihood ratios (LLRs) or other estimates of the relative probability of a given bit being 0 or 1. De-interleaving and rate recovery unit 226 can reverse the interleaving and rate matching operations that were performed at the transmitter. Decoding unit 228 can perform channel decoding to decode the code blocks and recover the data. As with corresponding components in TX section 204, the operations implemented in demapping unit 224, de-interleaving and rate recovery unit 226, and decoding unit 228 can be specific to a particular channel and/or a particular communication standard. Due to such differences, dedicated hardware pipelines can be constructed to support different physical channels (e.g., PDSCH vs. PDCCH) and/or different communication standards (e.g., 4G vs. 5G), or multipurpose pipelines that share hardware can be constructed.

Operation of the pipelines in TX section 202 and RX section 204 can be coordinated by control subsystem 230. Control subsystem 230 can include circuitry to manage communication between units in TX section 202 and RX section 204 and other components of cellular modem processor 200 (e.g., RF interface 250, main processor interface 260, and system memory interface 240) and/or between cellular modem processor 200 and other components of a device or system (e.g., user device 100 of FIG. 1) in which cellular modem processor 200 operates. A variety of implementations can be used, including various combinations of fixed-function circuitry and programmable circuitry executing program code provided as firmware. Shared memory subsystem 235 can include memory circuits (e.g., SRAM, DRAM, or the like), a read interface and a write interface connected via crossbars to TX section 202 and RX section 204 (or to individual units in TX section 202 and/or RX section 204), and arbitration logic to manage multiple requests (e.g., using time division multiplexing or other techniques). In some embodiments, shared memory subsystem 235 can be implemented such that any unit in TX section 202 or RX section 204 can access any location in the shared memory. A variety of architectures, including conventional architectures, can be used. In some embodiments, shared memory subsystem 235 can be used to transfer data into and out of TX section 202 and/or RX section 204, or between units within TX section 202 and/or RX section 204.

Main processor interface 260 can enable communicating with main processor 102 (shown in FIG. 1), via an interface such as Advanced extensible Interface (AXI), which is part of ARM Advanced Microcontroller Bus Architecture, or any other suitable interface for communication between a main processor and a coprocessor. Other interfaces to other components of user device 100 can also be provided, such as a system memory interface 240 that provides a direct memory access (DMA) interface to transfer data between shared memory subsystem 235 and system memory 106 of FIG. 1.

It will be appreciated that cellular modem processor 200 is illustrative and that variations and modifications are possible. A cellular modem processor can include any number and combination of pipelines, supporting any number and combination of cellular data communication standards. Control subsystems, memory subsystems and interfaces to other components can be varied as desired. In some embodiments, cellular modem processor 200 can have a high throughput to support high-speed cellular networks (e.g., 12 Gbps for a 5G network).

To support high-speed communication, the ability to perform DFT/FFT (and IDFT/IFFT) on data sets of variable sizes (e.g., up to N=4096 samples, or "points") is important. Dedicated DFT or FFT circuits can be used to support high-throughput DFT/FFT and/or IDFT/IFFT operations on large data sets. In this disclosure, the term "DFT/FFT" is used as a shorthand for a family of transforms that includes Fast Fourier Transform, other discrete Fourier transforms, and their inverse transforms. The term "sample" is used to refer to a data value at any stage of a DFT/FFT, including intermediate stages as well as the inputs and outputs of the transform.

Figure 3:
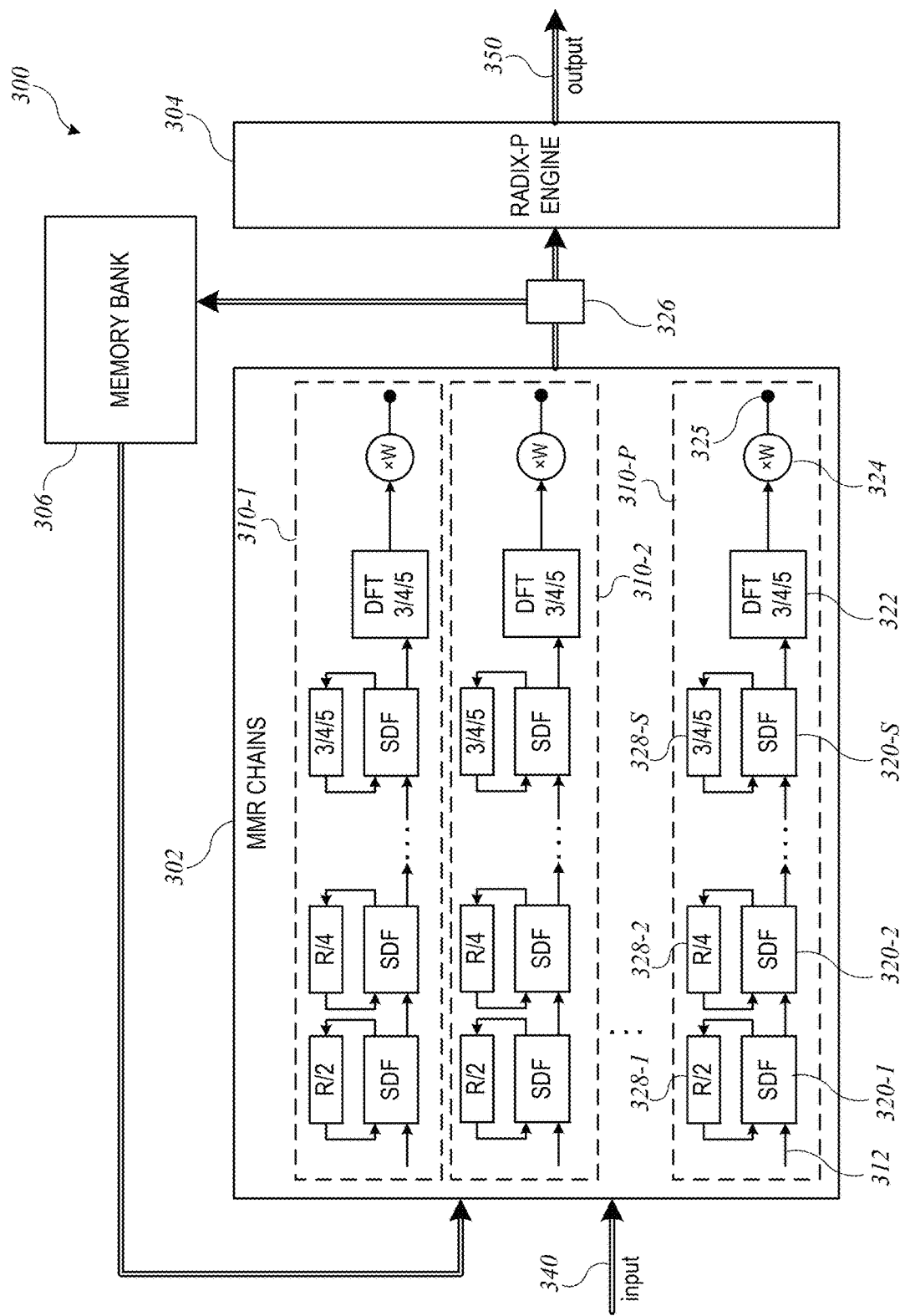
FIG. 3 shows a simplified block diagram of a reconfigurable DFT circuit according to some embodiments.

FIG. 3 shows a simplified block diagram of a reconfigurable DFT/FFT circuit 300 according to some embodiments. Circuit 300 includes a multi-mode radix ("MMR") section 302, a radix-P engine 304, and a memory bank 306. Circuit 300 can be dynamically configured to compute a DFT/FFT of arbitrary size N, where $N=2^a*3^b*5^c$ for non-negative integers a, b, c. Input 340 of circuit 300 can receive a set of P input samples per cycle, where P is a positive integer. In some embodiments, P is a power of 2; for example, P can be 4, 8, 16, or another number. The inputs are assumed to be floating-point complex numbers representing a set of data samples to be transformed using an N-point discrete Fourier transform. It should be understood that N can be greater than, less than, or equal to P. Circuit 300 can be a synchronous circuit in which operations are coordinated by a periodic clock cycle. In this example, circuit 300 implements decimation-in-frequency FFT. Those skilled in the art will appreciate that decimation-in-time implementations are also possible.

MMR section 302 includes a set of P multimode radix processing chains (or "MMR chains") 310-1 through 310-P. Each MMR chain 310 includes a number(S) of single delay feedback (SDF) circuits 320-1 through 320-S, connected in series, and a DFT 3/4/5 circuit 322 connected in series following the last SDF circuit 320-S. Each SDF circuit 320 can implement a radix-2 butterfly calculation with different amounts of delay provided by delay elements 328-1 through 328-S. DFT 3/4/5 circuit 322 can be a multi-radix DFT circuit that supports DFT computations with different radices. In the example shown in FIG. 3, DFT 3/4/5 circuit 322 can support radix-3, radix-4, and radix-5 DFT computations. Other multi-radix DFT circuits supporting a different number or combination of radices can also be used. Each MMR chain 310 can receive one sample per clock cycle via an input path 312, and each DFT 3/4/5 circuit 322 can produce one sample per clock cycle. Output samples from each DFT 3/4/5 circuit 322 pass through a twiddle multiplier 324 to a node 325 that represents the output path of MMR chain 310. The P samples from nodes 325 can be routed by an output routing switch 326 to either memory bank 306 or radix-P engine 304. Radix-P engine 304 can implement a P-point FFT (or DFT), thereby producing P output samples at final output path 350. In the configuration shown in FIG. 3, reconfigurable DFT/FFT circuit 300 can compute DFT/FFT for sizes (number of input data samples, N) up to $N=2^S*D*P$ in one iteration, where D is the selected radix for DFT 3/4/5 circuit 322. For larger sizes, output values can be routed to memory bank 306 and subsequently returned to the input paths 312 of MMR chains 310, thereby supporting transforms of larger sizes.

Figure 4:
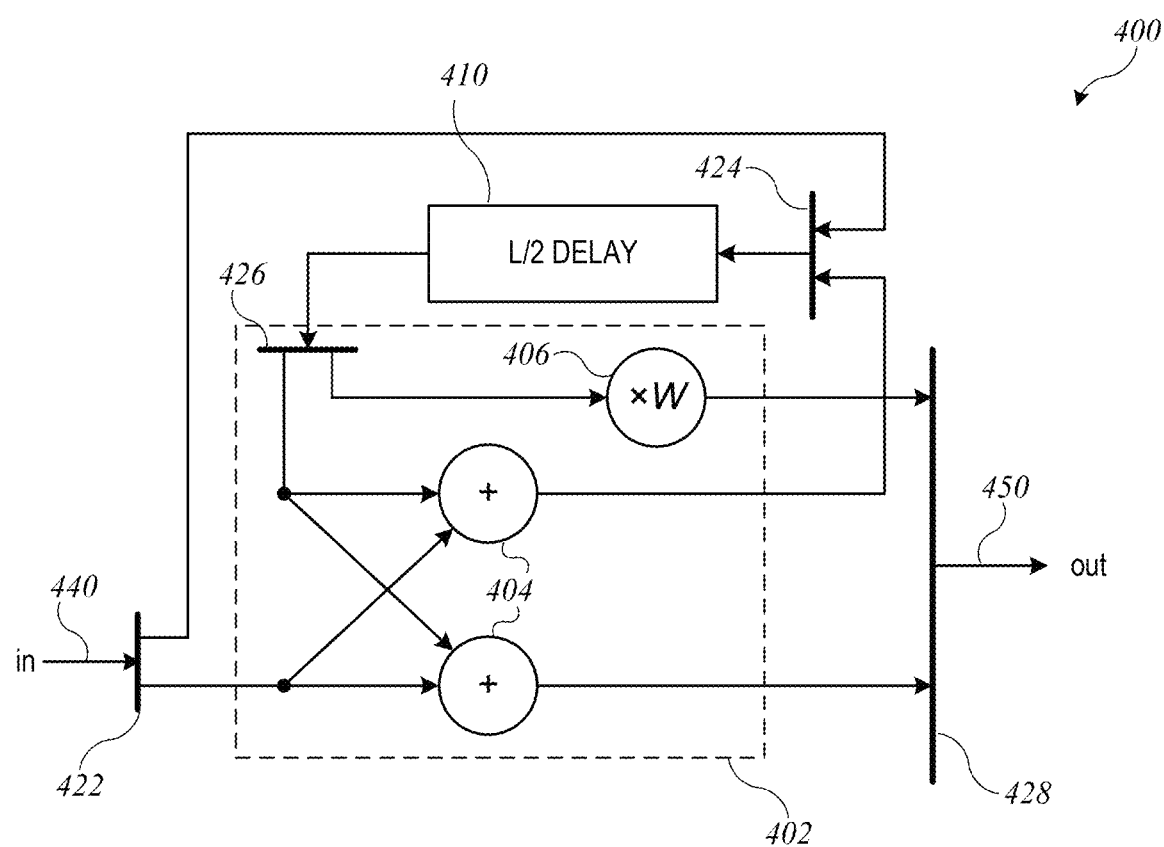
FIG. 4 shows a simplified schematic diagram of a single-delay feedback circuit that can be used in a reconfigurable DFT circuit according to some embodiments.

FIG. 4 shows a simplified schematic diagram of an SDF circuit 400 that can be used to implement any SDF circuit 320 of circuit 300 according to some embodiments. SDF circuit 400 includes a butterfly circuit 402 with a pair of adders 404 and a twiddle multiplier 406 that implement the well-known radix-2 FFT butterfly computation, together with routing switches 422, 424, 426, 428 to route samples through circuit 320. Delay buffer 410 can be a FIFO or other fixed-length delay circuit that outputs received data after a fixed delay (in this case L/2 clock cycles). SDF circuit 400 can operate on a set of L input samples to perform radix-2 butterfly computations on pairs of samples. In operation, one sample can be delivered to input 440 on each clock cycle. The first L/2 samples are routed to delay buffer 410 using routing switches 422 and 424. The next L/2 samples are routed to butterfly circuit 402, arriving together with earlier-received samples via delay buffer 410 and routing switch 426. Each operation of butterfly circuit 402 produces a pair of outputs. One output is routed to output path 450 via routing switch 428; the other output is routed to delay buffer 410 via routing switch 424. After a delay of L/2 cycles, the delayed outputs are routed to twiddle multiplier 406 via routing switch 426, then to output path 450 via routing switch 428. In this manner, SDF circuit 400 can receive one input sample per clock cycle and produce one output sample per clock cycle, producing a total of L samples.

As shown in FIG. 3, each MMR chain 310 can include a number of SDF circuits 320 (each of which can be an instance of SDF circuit 400) connected in series, with each SDF circuit 320-i having a delay buffer 328 with half the delay length of the previous SDF circuit 320-(i−1). Thus, for example, if SDF circuit 320-1 has a delay of R/2; SDF circuit 320 has a delay of R/4; and so on. The last delay element 328-S in each chain can be configurable to provide three, four, or five cycles of delay, depending on the radix selected for DFT 3/4/5 circuit 322. The delay parameter R can be determined based on the number S of SDF circuits 320 and the radix selected for DFT 3/4/5 circuit 322.

Figure 5:
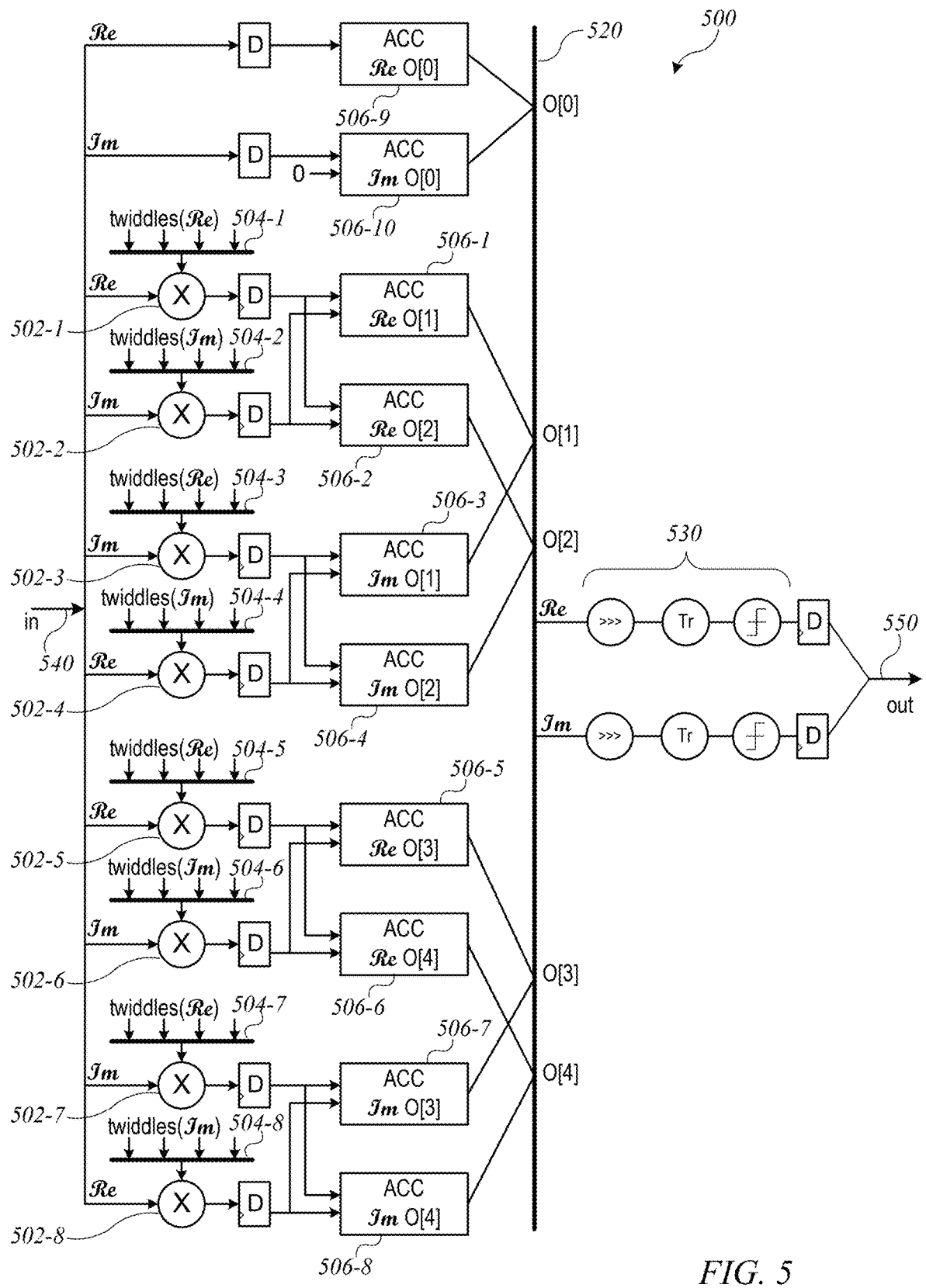
FIG. 5 shows a simplified schematic diagram of a variable-radix DFT circuit according to some embodiments.

The last SDF circuit 320-S in each MMR chain 310 provides its outputs to a DFT 3/4/5 circuit 322. DFT 3/4/5 circuit 322 can be a multi-radix DFT circuit that can be selectably operated in a radix-3 mode, a radix-4 mode, or a radix-5 mode. FIG. 5 shows a simplified schematic diagram of a multi-radix DFT circuit 500 according to some embodiments. Multi-radix DFT circuit 500 can be used to implement each DFT 3/4/5 circuit 322 in circuit 300, and in any other context where a multi-radix DFT circuit is desirable. Multi-radix DFT circuit 500 can be selectably operated in Like SDF circuits 320, multi-radix DFT circuit 500 receives one input sample per clock cycle and produces one output sample (O[i]) per clock cycle. Multi-radix DFT circuit 500 can perform computations of the form $$O[i] = \sum_{k=0}^{M-1} W_k^i z[k], i = 0, \ldots, M-1 \quad (1)$$

where z[0], . . . z[M−1] are the (complex-valued) input samples, $$W_k^i$$

is a twiddle factor (also a complex number), and M is the radix. (The particular twiddle factors $$W_k^i$$

for radix-3, radix-4, and radix-5 DFT are known in the art.) In a circuit implementation, multiplying two complex factors in one clock cycle generally requires four multipliers. In some embodiments, multi-radix DFT circuit 500 exploits symmetry properties of the twiddle factors to reduce the number of multipliers by a factor of two while completing the multiplications in one clock cycle.

Multi-radix DFT circuit 500 can include eight multipliers 502-1 through 502-8. Each of multipliers 502-1 through 502-8 can be a floating-point multiplier circuit that operates on two (real-number) inputs. Multi-radix DFT circuit 500 can receive one input sample per cycle via input path 540. Multipliers 502-1, 502-4, 502-5, and 502-8 can each receive the real (Re) part of each input sample while multipliers 502-2, 502-3, 502-6, and 502-7 can each receive the imaginary (Im) part of each input sample. Each multiplier 502-1 through 502-8 also has an associated twiddle selector 504-1 through 504-8 that selects an appropriate twiddle factor based on the radix and the sample number. In particular, twiddle selectors 504-1, 504-3, 504-5, and 504-7 can provide the real part of the appropriate twiddle factor while twiddle selectors 504-2, 504-4, 504-6, and 504-8 provide the imaginary part of the appropriate twiddle factor.

The result of each multiplication is provided to a pair of accumulators 506, each of which can be a circuit configured to add two values per clock cycle to a running sum stored in a buffer. As shown in FIG. 5, multipliers 502-1 and 502-2 provide results to accumulators 506-1 and 506-2; multipliers 502-3 and 502-4 provide results to accumulators 506-3 and 506-4; multipliers 502-7 and 502-8 provide results to accumulators 506-5 and 506-6; and multipliers 502-7 and 502-8 provide results to accumulators 506-7 and 506-8. Each accumulator 506-1 through 506-8 can add two results per clock cycle to a running sum over a group of M samples (where M is the currently-selected radix, e.g., 3, 4 or 5). In some embodiments, each accumulator 506 can have two buffers operated in a ping-pong fashion, in which one buffer is used to accumulate the running sum for incoming samples while the other buffer stores a previously computed sum that is awaiting its turn to be output; after M samples, the buffers can switch roles. Some or all of accumulators 506-1 through 506-8 can selectively negate (i.e., change the sign of) one or both inputs prior to adding. With appropriate selection of twiddle factors by twiddle selectors 504-1 through 504-8 and selective negation, accumulators 506-1 and 506-3 can compute the real and imaginary parts of output O[1] according to Eq. (1) above; accumulators 506-2 and 506-4 can compute the real and imaginary parts of output O[2]; accumulators 506-5 and 506-7 can compute the real and imaginary parts of output O[3]; and accumulators 506-6 and 506-8 can compute the real and imaginary parts of output O[4]. In the notational convention used herein, all twiddle factors for output O[0] in Eq. (1) are equal to 1 for any radix, so no multipliers are used to compute output O[0]. Instead, the real and imaginary parts of each input sample can be provided directly to accumulators 506-9 and 506-10. Accumulators 506-9 and 506-10 can be identical to accumulators 506-1 through 506-8, and the second input can be fixed at zero as shown in FIG. 5.

Output selector 520 can select one pair of accumulators 506 per cycle to deliver the real and imaginary parts of one output sample to output section 530. In some embodiments, output samples are selected in index order, with O[0] (accumulators 506-9 and 506-10) selected on a first cycle, O[1] (accumulators 506-1 and 506-3) selected on the next cycle, and so on. Output section 530 can perform various post-computation operations such as merging, truncation, and saturation (examples of such operations are known in the art) prior to delivering the final (complex-valued) output sample at output path 550.

In some embodiments, circuit 500 can support a radix-5 DFT using all accumulators 506-1 through 506-10 and all multipliers 502-1 through 502-8. Circuit 500 can also support a radix-4 DFT using accumulators 506-9 and 506-10 to produce output O[0] and three other pairs of accumulators to produce the other outputs. For instance, accumulators 506-1 and 506-3 can be used to produce output O[1], accumulators 506-2 and 506-4 to produce output O[2], and accumulators 506-5 and 506-7 to produce output O[3]. Circuit 500 can also support a radix-3 DFT using accumulators 506-9 and 506-10 to produce output O[0] and two other pairs of accumulators to produce the other outputs. For instance, accumulators 506-1 and 506-3 can be used to produce output O[1], and accumulators 506-2 and 506-4 to produce output O[2]. Twiddle selectors 504-1 through 504-8 can be configured to select from a list of twiddle factors based on the radix and the sample number. The list of twiddle factors can be determined based on general principles of FFT and DFT algorithms for each radix, and an explicit listing is omitted.

It will be appreciated that multi-radix DFT circuit 500 is illustrative and that variations and modifications are possible. In some embodiments, circuit 500 can be modified to support additional radices (e.g., radix 7) by providing additional pairs of multipliers and accumulators and additional options for twiddle factors to be selected by the twiddle selectors. In some embodiments, where the selected radix is smaller than the maximum supported radix, any accumulator and/or multiplier circuits that are not in use can be placed into a low-power state.

Referring again to FIG. 3, circuit 500 can be used to implement the multi-radix DFT circuit 322 in each MMR chain 310. Other DFT circuits that support multiple radices can be substituted. A set of P outputs from the DFT 3/4/5 circuits 322 can be provided to memory bank 306 (for use in subsequent iterations) or to radix-P engine 304 (for final output). Memory bank 306 can be any memory circuit that is capable of receiving and storing P (complex-valued) inputs per clock cycle and retrieving and outputting P (complex-valued) outputs per clock cycle. Various designs, including conventional memory circuits, can be used. In some embodiments, memory bank 306 can provide enough capacity to store N complex values, although those skilled in the art with access to this disclosure will appreciate that a smaller memory bank can be used.

Figure 6:
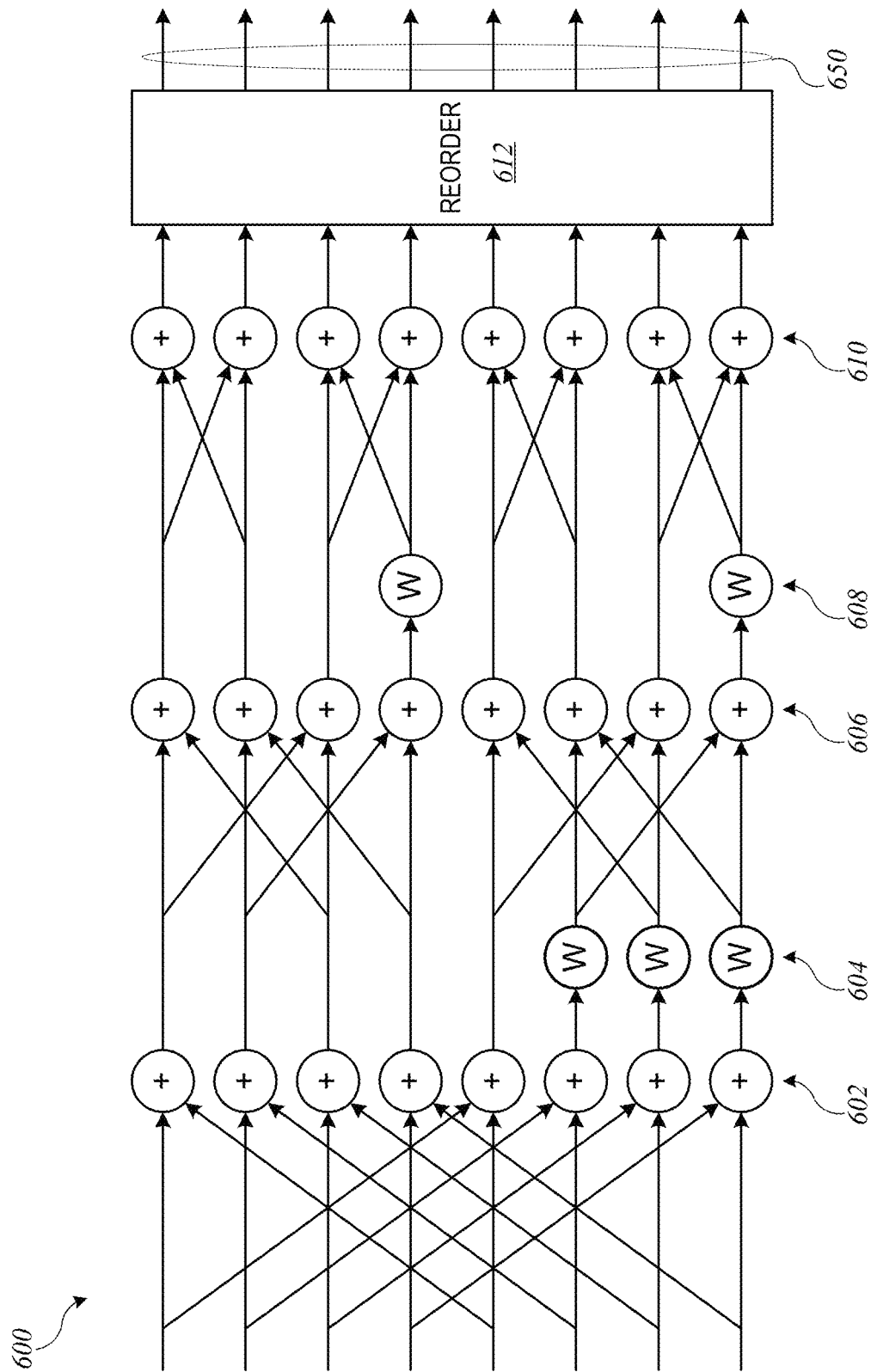
FIG. 6 shows a simplified schematic diagram of a radix-8 FFT circuit that can be used in a reconfigurable DFT circuit according to some embodiments.

Radix-P engine 304 can be any circuit that implements a radix-P FFT or DFT. By way of example, FIG. 6 shows a simplified schematic diagram of a radix-8 FFT circuit 600 that can be used to implement radix-P engine 304 in some embodiments where P=8. Radix-8 FFT circuit 600 can be a conventional decimation-in-frequency FFT circuit that includes adders 602, 606, 610 and twiddle multipliers 604, 608. A reordering circuit 612 can reorder the samples (e.g., using standard bit-reversal techniques) prior to delivering P outputs on output paths 650. Other circuits can also be used as radix-P engine 304, and P is not limited to being 8. In some embodiments, radix-P engine 304 can be a reconfigurable circuit that also supports selected radices smaller than P. For example, radix-8 FFT circuit 600 can support a radix-4 FFT by bypassing adders 602 and using only four of the eight data paths.

The physical size of circuit 300, though not the maximum size of transform that circuit 300 can perform, is a function of parameters P (the number of MMR chains) and S (the number of SDF circuits 320 in each MMR chain). In various embodiments, parameters S and P can be selected as desired. For efficient operation, memory bank 306 and the data source that provides the input samples to input path 340 should be able to supply P samples in one clock cycle. Accordingly, P can be selected based on the widths of data paths in a processor where circuit 300 is implemented. For example, in a SIMD processor having some number of data lanes, P can be chosen to match the number of data lanes. As a practical matter, DFT/FFT sizes of interest often involve powers of 2, and selecting P to be a power of 2 may facilitate selecting configurations for circuit 300. As noted above, in some embodiments, P=8 can be selected, but other choices are possible (e.g., P=2, 4, 16, etc.). S can be selected based on tradeoffs between operating speed and area. For a given value of P, a larger value of S can increase throughput by increasing the maximum radix of the computation in each iteration through MMR chains 310; however, increasing S also increases the area occupied by circuit 300. Since each SDF circuit is replicated in each MMR chain, each incremental increase in S increases the area by roughly P times the area of an SDF circuit. In some embodiments, S can be 2, 3, 4, or some larger number.

Regardless of the choice of values for parameters P and S, circuit 300 of FIG. 3 can be dynamically reconfigurable to compute FFT/DFT of various sizes (N). A single iteration through MMR chains 310 can compute FFT/DFT for sizes N up to $2^S*D*P$, where D is the selected radix for DFT 3/4/5 circuits 322. For instance, if S=2 and P=3, transform sizes up to 96 (for D=3), 128 (for D=4), or 160 (for D=5) can be computed in a single iteration. Where N is larger than this limit, circuit 300 can compute the FFT/DFT using multiple iterations through MMR chains 310, followed by a final pass through radix-P engine 304.

Figure 7:
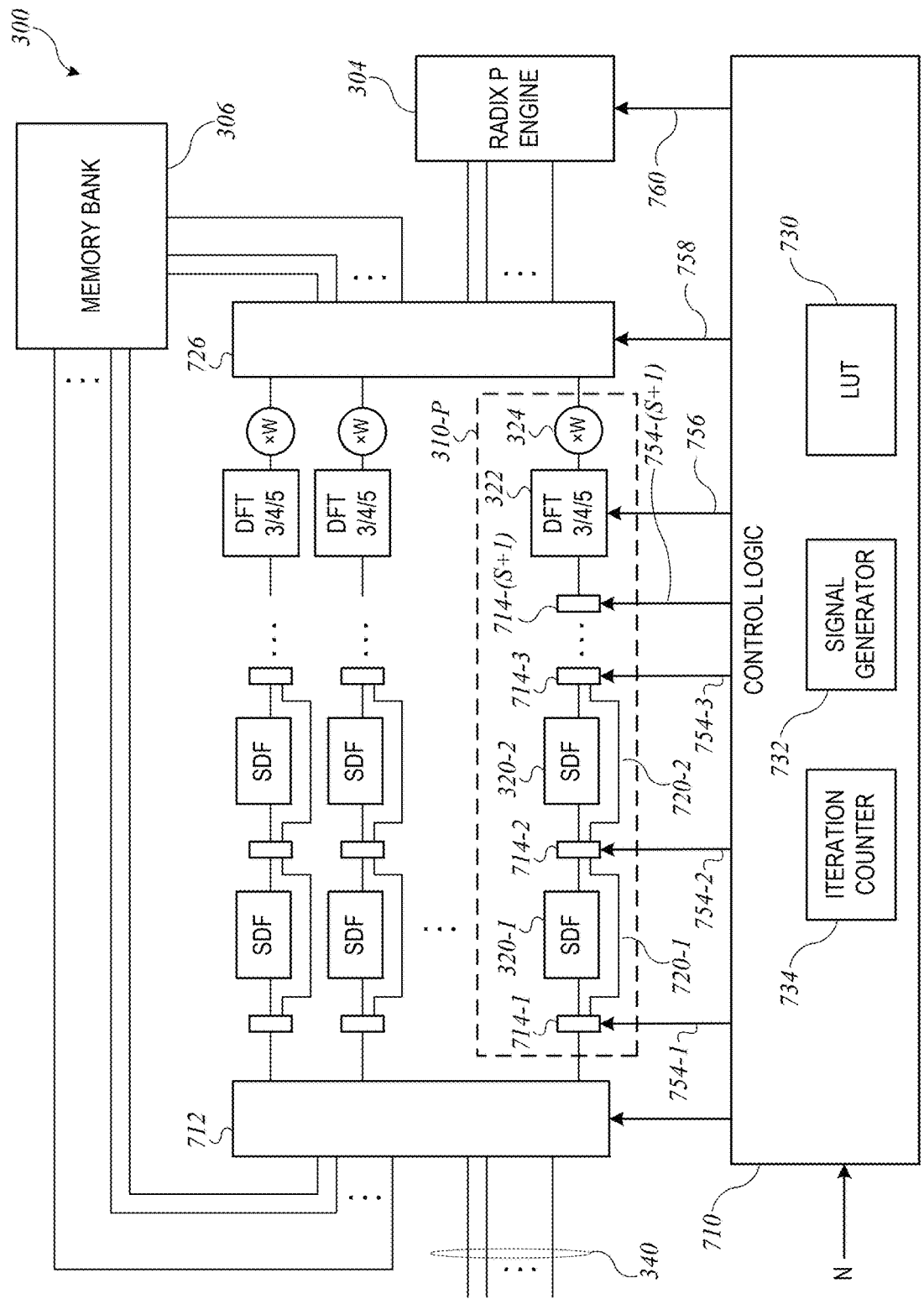
FIG. 7 shows another simplified block diagram of a reconfigurable DFT circuit according to some embodiments.

In some embodiments, the number of iterations and the configuration of MMR chains 310 for each iteration can be controlled using dedicated control logic to configure circuit 300 based on the size of the transform to be performed. FIG. 7 shows another simplified block diagram illustrating control logic and routing circuits that can be included in circuit 300 according to some embodiments. As shown for MMR chain 310-P, each SDF circuit 320 can have an associated bypass path 720. Bypass switches 714 can be controlled to either activate or bypass each SDF circuit 320. An input routing switch 712 can be controlled to selectably deliver either a new set of P input samples from input path 340 or an iterating set of P samples from memory bank 306 to MMR chains 310. At the output of MMR chains 310, an output routing switch 726 can be controlled to selectably deliver a set of P samples either to memory bank 306 (for a subsequent iteration through MMR chains 310) or to radix-P engine 304.

Control logic 710 can dynamically reconfigure circuit 300 to compute transforms of different sizes. For instance, control logic 710 can control bypass switches 714, routing switches 712, 726, and the radix for DFT 3/4/5 circuit 322. In some embodiments, control logic 710 can be implemented as a special-purpose digital logic circuit that generates control signals to each bypass switch 714 and each routing switch 712, 726 based on the size (N) of the FFT or DFT to be performed. For example, control logic 710 can include a lookup table 730 that stores, for each supported transform size N, configuration information including the number of iterations and a specific configuration for each iteration, including which circuits in MMR chains 310 should be active or bypassed and which radix to use in DFT 3/4/5 circuits 322. Control logic 710 can also include an iteration counter 734 and a signal generator 732 that reads lookup table 730 and generates control signals corresponding to the configuration information in lookup table 730 and the current iteration. The control signals can include: a control signal 752 to input routing switch 712 that selects input path 340 as the data source during the first iteration and memory bank 306 as the data source during each subsequent iteration; a control signal 754 to each bypass switch 714 in each MMR chain 310 (shown for MMR chain 310-P); a control signal 756 to DFT 3/4/5 circuit 322 to select a radix; a control signal 758 to output routing switch 726 that routes the outputs of MMR chain 310 to radix-P engine 304 on the last iteration and to memory bank 306 for each iteration other than the last; and a control signal 760 to radix-P engine 304 to select the radix (assuming that radix-P engine 304 supports selection of radix). In some embodiments, control logic 710 can also generate control signals to control the selection of twiddle factors according to the radix (e.g., for DFT 3/4/5 circuit 322).

FIG. 8 shows a table 800 with examples of configuration information that can be represented in lookup table 730 according to some embodiments. For purposes of illustration it is assumed that P=8 and S=2. Each row 821-824 in table 800 is associated with a specific DFT/FFT size N, listed in column 802. Each transform size N can be decomposed into an ordered sequence of smaller radices (such that N=r1* r2* . . . ), as shown in column 806. In this example, since P=8, radix-P engine 304 can perform a final radix-8 operation; accordingly, decompositions in which the last radix is 8 are preferred. The rest of the decomposition can include any combination of radices supported by the MMR chains. (As used herein, a radix is "supported by" the MMR chains if an operation with that radix can be performed in one iteration through one MMR chain 310. For example, if each MMR chain 310 includes two SDF circuits 320 and one DFT 3/4/5 circuit 322, then the MMR chains 310 support radices 2, 3, 4, 5, 6, 8, 10, 12, 16, and 20.) Accordingly, in row 821, N=128 can be decomposed into a radix-16 operation followed by a radix-8 operation. In row 822, N=256 can be decomposed into a radix-4 operation followed by a radix-8 operation, followed by another radix-8 operation. Rows 823 and 824 show decompositions for N=1200 and N=1536. The decomposition in column 806 determines the number of iterations, listed in column 804. In table 800, the number of iterations is one less than the number of radices in the decomposition because the final radix-8 operation does not involve an iteration through MMR chains 310.

Columns 808 and 810 indicate the configuration of MMR chains 310 for each radix in column 806, and column 812 indicates operations performed in radix-P engine 304. For instance, in row 821 (N=128), sub-row 821*a* shows the configuration of MMR chains 310 for a radix-16 operation, and sub-row 821*b* represents the final radix-8 operation. As shown in sub-row 821*a*, for radix 16, both SDF circuits 320 can be used; the notation 2×2 in column 808 indicates that each SDF circuit 320 contributes a radix-2 operation. DFT 3/4/5 circuit 322 can operate in radix-4 mode, as indicated in column 810. As shown in sub-row 821b, the final radix-8 operation can be performed in radix-P engine 304, as indicated in column 812.

Row 822 shows an example that involves two iterations through MMR chains 310. As shown in sub-row 822a, the first iteration has radix 4; this can be implemented by bypassing both SDF circuits 320 (noted as "bypass" in column 908) and operating DFT 3/4/5 circuit 322 in radix-4 mode. As shown in sub-row 822b, the second iteration has radix 8; this can be implemented in MMR chains 310 by operating one SDF circuit 320 (the last SDF circuit in the chain) to provide a radix-2 operation and operating DFT 3/4/5 circuit 322 in radix-4 mode. Sub-row 822c represents the final radix-8 operation using radix-P engine 304.

Rows 823 and 824 show examples where N is not a power of 2. In row 823, N=1200 is decomposed as 5*5*6*8. As shown in sub-rows 823a and 823b, each radix-5 operation is implemented by bypassing SDF circuits 320 and operating DFT 3/4/5 circuit 322 in radix-5 mode. As shown in sub-row 823c, the radix-6 operation is provided by operating one SDF circuit 320 (the last SDF circuit in the chain) together with DFT 3/4/5 circuit 322 in radix-3 mode. Sub-row 823d represents the final radix-8 operation using radix-P engine 304. In row 824, N=1536 is decomposed as 12*16*8. As shown in sub-row 824a, the radix-12 operation is implemented by using both SDF circuits 320 together with DFT 3/4/5 circuit 322 in radix-3 mode. As shown in sub-row 824b, the radix-16 operation is implemented by using both SDF circuits 320 together with DFT 3/4/5 circuit 322 in radix-4 mode. Sub-row 824c represents the final radix-8 operation using radix-P engine 304.

It will be appreciated that the decompositions shown in FIG. 8 are merely examples. Similar radix decompositions can be applied to other transform sizes. In some embodiments, an optimal decomposition for a given N can be selected according to considerations such as: selecting the last radix to be equal to P; selecting each radix other than the last to be a radix supported by the MMR chains; and selecting a decomposition that minimizes the number of iterations. It should be understood that the optimal decomposition of N might not be unique, and it is not required that the decomposition used be an optimal decomposition. It should also be understood that the format shown for table 800 is used herein to facilitate understanding of the present disclosure; a different format (e.g., binary values for control of switches, encoded values for radix selection) can be used in lookup table 730 to provide configuration information to control logic 710.

Figure 9:
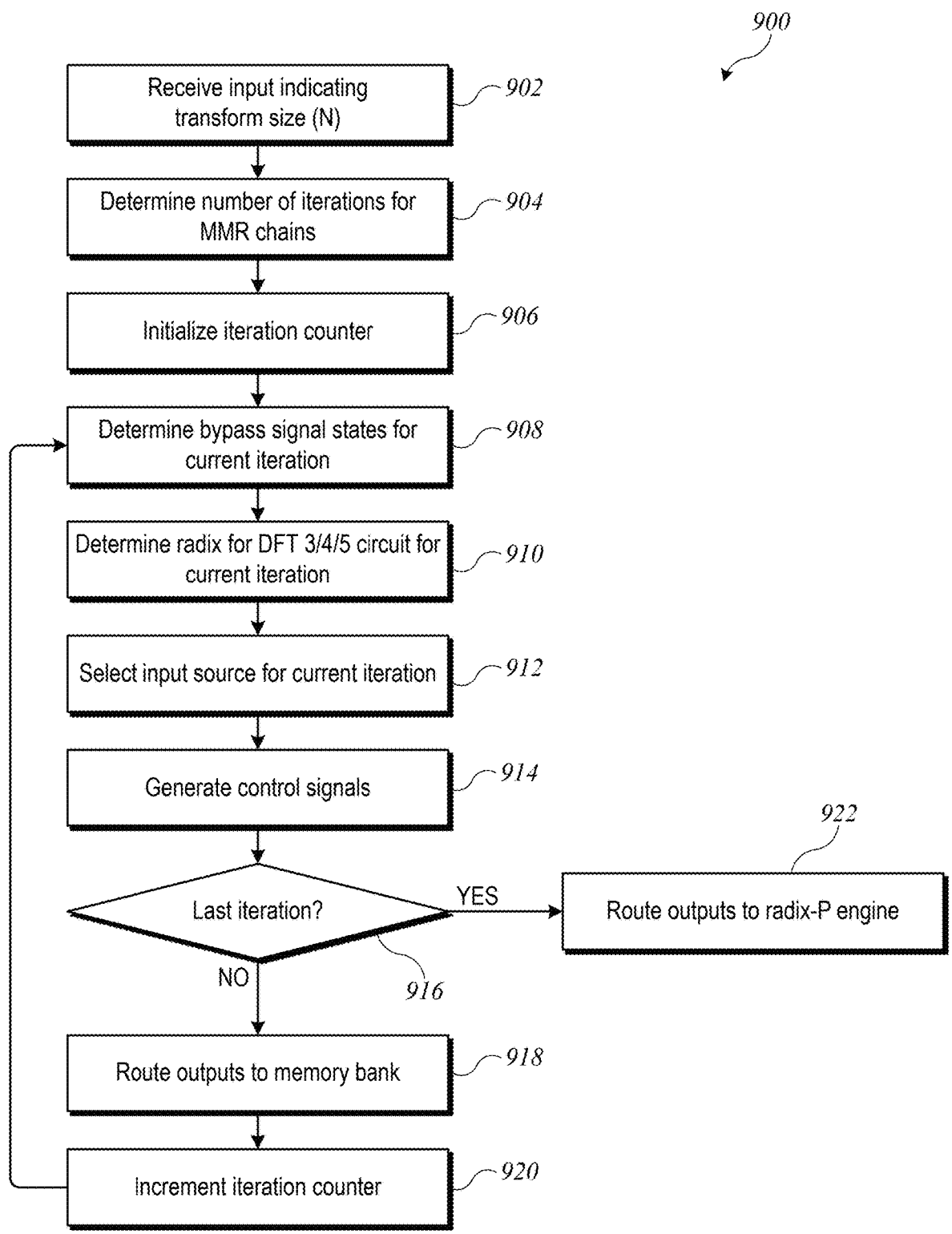
FIG. 9 is a flow diagram of a process for operating a reconfigurable DFT circuit according to some embodiments.

In operation, control logic 710 can control operation of reconfigurable DFT/FFT circuit 300. FIG. 9 is a flow diagram of a process 900 for controlling operation of a reconfigurable DFT/FFT circuit according to some embodiments. Process 900 can be implemented, e.g., in control logic 710 of reconfigurable DFT/FFT circuit 300, using lookup table 730, which can store information as described above with reference to table 800. At block 902, control logic 710 can receive an input signal indicating a transform size N for a DFT/FFT operation to be performed. At block 904, control logic 710 can determine the number of iterations through MMR chains 310 to be performed. For example, control logic 710 can use size N to select the corresponding row in table 800 and read the number of iterations. At block 906, control logic 710 can initialize iteration counter 734 (e.g., to zero). At block 908, control logic 710 can determine bypass signal states (e.g., control signals for bypass switches 714). For example, referring to table 800, control logic 710 can use the iteration counter to select the corresponding sub-row and determine, based on column 808, whether each SDF circuit 320 is active or bypassed. In the notation of FIG. 8, "2×2" indicates two active SDF circuits 320, "2" indicates one active SDF circuit 320, and "bypass" indicates no active SDF circuits 320. In instances where some but not all SDF circuits 320 are active (e.g., sub-row 822b), the bypassed SDF circuits 320 can be the ones at the beginning of the chain. At block 910, control logic 710 can determine the state for DFT 3/4/5 circuit 322. For example, where lookup table 800 is used, control logic 710 can use iteration counter 734 to select the corresponding sub-row and determine, based on column 810, the radix for DFT 3/4/5 circuit 322. At block 912, control logic 710 can select a data source for MMR chains 310 based on iteration counter 734. For example, for the first iteration, input path 340 can be selected; for each subsequent iteration, memory bank 306 can be selected. At block 914 control logic 710 can generate control signals to implement the configuration determined at blocks 908, 910, and 912. For instance, control logic 710 can generate a control signal for input routing switch 712 to select the input; a control signal for each bypass switch 714 to activate the desired subset of SDF circuits; and a control signal for DFT 3/4/5 circuit 322 to select the radix.

At block 916, control logic 710 can determine whether the current iteration is the last iteration. If not, then at block 918, control logic 710 can route the outputs of MMR chains 310 (from nodes 325 in FIG. 3) to memory bank 306 for a subsequent iteration. For example control logic 710 can generate an appropriate control signal for output routing switch 726. At block 920, control logic 710 can increment the iteration counter, after which process 900 can return to block 908 to determine a new set of signal states for the next iteration. If, at block 916, the current iteration is the last iteration, then at block 922, control logic 710 can route the outputs of MMR chains 310 (from nodes 325 in FIG. 3) to radix-P engine 304. For example control logic 710 can generate an appropriate control signal for output routing switch 726. In embodiments where radix-P engine 304 is reconfigurable (e.g., to perform computations with radix less than P), control logic 710 can also generate a control signal to radix-P engine 304 to configure the radix.

It should be understood that one iteration through MMR chains 310 can consume multiple clock cycles. For example, for transform size N, inputting N data samples can consume N/P cycles. The circuits in MMR chains 310 can introduce various delays, and the first set of P samples can arrive at output routing switch 726 some number of cycles after the first set of P input samples entered MMR chains 310. (The number of cycles of delay can depend on the radix for a given iteration.) In addition, operation of MMR chains 310 can be pipelined such that the first SDF circuit 320-1 in the chain can begin processing samples for a second iteration before the last sample from a previous iteration has been output from DFT 3/4/5 circuit 322. Control logic 710 can be configured to generate control signals with the appropriate timing such that each reconfigurable switch or circuit receives the correct control signal for the iteration currently passing through that switch or circuit. In addition, where appropriate, control logic 710 can delay initiation of a subsequent iteration if the subsequent iteration has a smaller radix (and therefore shorter delay) than the preceding iteration, to prevent a subsequent iteration from colliding with a preceding iteration. In some embodiments, ordering the iterations such that iterations are executed in order of non-decreasing MMR-chain radix (as in the examples in FIG. 8) can avoid the need to introduce such delays.

It will be appreciated that the circuits and methods described herein are illustrative and that variations and modifications are possible. Operations described sequentially can be executed in parallel except where logic dictates otherwise, and order of operations can be varied except where logic dictates otherwise. For instance, in some embodiments control logic 710 can determine all control signals for a given transform size N using a single access to lookup table 730. The particular circuits implementing SDF circuits 320, DFT 3/4/5 circuits 322, and radix-P engine 304 can be replaced with other circuits that support similar operations. In some embodiments, DFT 3/4/5 circuit 322 can be modified to support additional radices (e.g., radix 7). While the embodiments shown implement FFT and DFT using decimation in frequency, decimation in time can be substituted.

For simplicity of illustration, the drawings omit sign flips that may be applied prior to adding in various circuits or circuit blocks. Those skilled in the art will be able to determine appropriate signs for a given transform. In some embodiments, application of sign flips can be controlled on a per-sample basis. Similarly, while values of the various twiddle factors are not shown, the appropriate values of twiddle factors for each circuit can be readily determined from the well-known mathematics of discrete and/or Fast Fourier transforms. It should also be understood that the same circuit can be used for performing Fourier transforms in both the forward (time-to-frequency) and inverse (frequency-to-time) directions.

In examples described above, DFT 3/4/5 circuits 322 in each MMR chain 310 are assumed to be active on each iteration, and a bypass path around DFT 3/4/5 circuits 322 is not shown. In some embodiments, bypass paths can be provided around the multi-radix DFT circuit in an MMR chain.

In examples described above, memory bank 306 is a memory bank within circuit 300 that is dedicated to storing data during operations of circuit 300, and a single memory bank (with P-wide access) is used to support all MMR chains 310. However, a single dedicated memory bank is not required, and in various embodiments, any available memory that supports P-wide access can be used to store values between iterations through MMR chains 310. For instance, in some embodiments each MMR chain can have a separate memory bank (with single-wide access), although this may increase the area of circuit 300. In other embodiments, a reconfigurable DFT/FFT circuit can be implemented without a dedicated memory bank; instead, the reconfigurable DFT/FFT circuit can use a shared memory as a buffer memory to hold samples between iterations through the MMR chains. For instance, referring to FIG. 2, shared memory subsystem 235 can be used to provide the buffer memory for a reconfigurable DFT/FFT circuit that may be implemented in IFFT unit 218 or FFT unit 222. Similarly, any other available memory can be used.

The control logic described above is also illustrative. In various embodiments, any logic circuit capable of generating an appropriate sequence of control signals based on the transform size can be used. The use of lookup tables or any other particular data structure to select control signals is optional.

As noted above, the degree of parallelism (P) and number (S) of SDF stages per MMR chain are design parameters that can be chosen as desired. In some embodiments, P can be a power of 2 (e.g., 2, 4, 8, 16), which can simplify design of the radix-P engine and other components; however, P can also be a different number. S can be 2, 3, 4, or any other number as desired. For a given transform size N, a decomposition can be selected for the particular combination of P and S.

Circuits and methods of the kind described herein can provide fast computation of FFT and/or DFT, in part due to the P-way parallelism of the MMR processing chains. The iterative operation can reduce area and improve power efficiency. As noted above, the number of SDF circuits in a processing chain can be selected as desired based on area/speed tradeoffs. Further, as described above, such circuits can be reconfigured in real time to support transforms of different sizes using the same hardware. In some embodiments circuits as described herein can support FFT or DFT of any size N that can be decomposed as $N=2^a*3^b*5^c$. By providing a multi-radix DFT circuit with a different combination of supported radices, other FFT or DFT sizes can be supported.

In a microprocessor such as a cellular modem, multiple copies of the same FFT/DFT circuit can be deployed if desired. For instance, different copies can be deployed to support FFT/DFT operations at different stages in a signal-processing pipeline or to support FFT/DFT operations associated with different signal-processing pipelines. Because the same circuit supports multiple transform sizes, the copies can be identical even if the transforms for a particular deployment have different sizes. This can simplify design and validation of a processing pipeline or microprocessor chip. In some embodiments, the reconfigurability can be tailored to a particular application, e.g., by providing the control logic with mappings to control signals for the possible transform sizes N associated with that application.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise" or "can arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The word "can" is used herein in the same permissive sense (i.e., having the potential to, being able to).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set {w, x, y, z}, these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set {w, x, y, z}, thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, Applicant will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A circuit comprising:
   a number (P) of multimode radix processing chains operable in parallel, wherein P is at least 2, the multimode radix processing chains each including one or more single-delay feedback (SDF) circuits connected in series and a multi-radix discrete Fourier transform (DFT) circuit connected in series with the one or more SDF circuits, wherein each of the multimode radix processing chains has an input path and an output path;
   a radix-P engine configured to perform a radix-P DFT computation on a set of P samples received in parallel from the P multimode radix processing chains;
   a memory;
   an output routing switch coupled to the output paths of the multimode radix processing chains, the radix-P engine, and the memory, the output routing switch being configured to selectably deliver output samples from the output paths of the multimode radix processing chains to either the radix-P engine or the memory;
   an input routing switch coupled to the memory, an external data source, and the input paths of the P multimode radix processing chains, the input routing switch being configured to selectably deliver input samples from either the memory or the external data source to the multimode radix processing chains; and
   a control logic circuit coupled to the multimode radix processing chains, the memory, the output routing switch, and the input routing switch, the control logic circuit being configured to receive a input signal indicating a size of a transform to be computed and to control operation of the P multimode radix processing chains, the radix-P engine, the output routing switch, and the input routing switch to compute the transform, wherein the control logic circuit is further configured to determine, based on the input signal, a number of iterations through the P multimode radix processing chains and, for each iteration, whether to bypass or activate individual ones of the SDF circuits in the multimode radix processing chains and a radix to use for the multi-radix DFT circuit.

2. The circuit of claim 1 wherein the multi-radix DFT circuit is connected in series after the last SDF circuit in the multimode radix processing chain.

3. The circuit of claim 1 wherein the multi-radix DFT circuit supports DFT computations for radix-3, radix-4, and radix-5.

4. The circuit of claim 1 wherein the multi-radix DFT circuit includes:
   a plurality of twiddle selectors, the twiddle selectors configured to select a twiddle factor for a DFT computation, wherein the selection of the twiddle factor is based on a selected radix for the multi-radix DFT circuit and a sample number;
   a plurality of multiplier circuits, the multiplier circuits coupled to different ones of the plurality of twiddle selectors and to a multi-radix DFT input path that provides either a real part or an imaginary part of an input data sample per clock cycle;
   a plurality of accumulators coupled to the plurality of multiplier circuits and configured to accumulate a sum representing either a real part or an imaginary part of one transformed sample; and
   an output selector coupled to the plurality of accumulators and configured to output the real part and the imaginary part of a different one of the transformed samples per clock cycle.

5. The circuit of claim 1 wherein the multimode radix processing chains each include at least two SDF circuits connected in series.

6. The circuit of claim 1 wherein the memory is a dedicated memory bank.

7. A microprocessor comprising:
   a digital signal processing pipeline that includes a reconfigurable Fourier transform circuit, the reconfigurable Fourier transform circuit including:
      a number (P) of multimode radix processing chains operable in parallel, wherein P is at least 2, the multimode radix processing chains each including one or more single-delay feedback (SDF) circuits connected in series and a multi-radix discrete Fourier transform (DFT) circuit connected in series with the one or more SDF circuits, wherein each of the multimode radix processing chains have has an input path and an output path;
      a radix-P engine configured to perform a radix-P DFT computation on a set of P samples received in parallel from the P multimode radix processing chains;
      a memory;
      an output routing switch coupled to the output paths of the multimode radix processing chains, the radix-P engine, and the memory, the output routing switch being configured to selectably deliver output samples from the output paths of the multimode radix processing chains to either the radix-P engine or the memory;
      an input routing switch coupled to the memory, an external data source, and the input paths of the P multimode radix processing chains, the input routing switch being configured to selectably deliver input samples from either the memory or the external data source to the multimode radix processing chains; and
      a control logic circuit coupled to the multimode radix processing chains, the memory, the output routing switch, and the input routing switch, the control logic circuit being configured to receive a input signal indicating a size of a transform to be computed and to control operation of the P multimode radix processing chains, the radix-P engine, the output routing switch, and the input routing switch to compute the transform, wherein the control logic circuit is further configured to determine, based on the input signal, a number of iterations through the P multimode radix processing chains and, for each iteration, whether to bypass or activate individual ones of the SDF circuits in the multimode radix processing chains and a radix to use for the multi-radix DFT circuit.

8. The microprocessor of claim 7 wherein the memory is a memory bank within the reconfigurable Fourier transform circuit.

9. The microprocessor of claim 7 wherein the memory is a shared memory that is accessible by the reconfigurable Fourier transform circuit and by at least one other circuit in the digital signal processing pipeline.

10. The microprocessor of claim 7 wherein, in each of the multimode radix processing chains, the multi-radix DFT circuit is the last module.

11. The microprocessor of claim 7 wherein the multi-radix DFT circuit in each of the multimode radix processing chains supports DFT computations for radix-3, radix-4, and radix-5.

12. The microprocessor of claim 7 wherein the multi-radix DFT circuit in each of the multimode radix processing chains includes:
  a plurality of twiddle selectors, the twiddle selectors configured to select a twiddle factor for a DFT computation, wherein the selection of the twiddle factor is based on a selected radix for the multi-radix DFT circuit and a sample number;
  a plurality of multiplier circuits, the multiplier circuits coupled to different ones of the plurality of twiddle selectors and to a multi-radix DFT input path that provides either a real part or an imaginary part of an input data sample per clock cycle;
  a plurality of accumulators coupled to the plurality of multiplier circuits and configured to accumulate a sum representing either a real part or an imaginary part of one transformed sample; and
  an output selector coupled to the plurality of accumulators and configured to output the real part and the imaginary part of a different one of the transformed samples per clock cycle.

13. The microprocessor of claim 7 wherein the multimode radix processing chains each include at least two SDF circuits connected in series.

14. The microprocessor of claim 7 wherein the digital signal processing pipeline is a SIMD pipeline having a number of data lanes and wherein P is equal to the number of data lanes.

15. A method of computing a discrete Fourier transform, the method comprising:
  providing a number (P) of input samples per clock cycle to a reconfigurable Fourier transform circuit having a set of P multimode radix processing chains operable in parallel, wherein P is at least 2, each of the multimode radix processing chains including one or more single-delay feedback (SDF) circuits connected in series and a multi-radix discrete Fourier transform (DFT) circuit connected in series with the one or more SDF circuits, wherein each of the multimode radix processing chains has an input path and an output path, the reconfigurable Fourier transform circuit further having a radix-P engine configured to perform a radix-P DFT computation on a set of P samples received in parallel from the P multimode radix processing chains;
  determining, based at least in part on a size of the discrete Fourier transform, a number of iterations through the set of P multimode radix processing chains;
  determining, based at least in part on the size of the discrete Fourier transform, whether to bypass or activate individual ones of the SDF circuits in the multimode radix processing chains for each iteration; and
  determining, based at least in part on the size of the discrete Fourier transform, a radix for the multi-radix DFT circuits in the multimode radix processing chains for each iteration;
  generating control signals to perform the number of iterations through the set of P multimode radix processing chains, wherein generating the control signals includes generating a first subset of control signals to bypass or activate the SDF circuits in the multimode radix processing chains and generating a second subset of control signal to select the radix for the multi-radix DFT circuits; and
  during a last iteration of the number of iterations, providing output samples from the output paths of the multimode radix processing chain to the radix-P engine.

16. The method of claim 15 further comprising:
  during a first iteration of the number of iterations, providing a set of P input samples per clock cycle from an external data source to the input paths of the P multimode radix processing chains until a number of samples equal to the size of the discrete Fourier transform has been provided;
  during each iteration except the last iteration, routing samples from the output paths of the P multimode radix processing chains to a memory; and
  during each iteration except the first iteration, routing samples from the memory to the input paths of the P multimode radix processing chains.

17. The method of claim 15 wherein determining the number of iterations is based on decomposing the size (N) of the discrete Fourier transform into a product of two or more radices such that a last radix in the product is equal to the number P and such that each other radix in the product is associated with one of the iterations.

18. The method of claim 17 wherein determining whether to bypass or activate the SDF circuits in the multimode radix processing chains for a particular one of the iterations is based on the radix associated with the particular one of the iterations.

19. The method of claim 17 wherein determining the radix for the multi-radix DFT circuits in the multimode radix processing chains for a particular one of the iterations is based on the radix associated with the particular one of the iterations.

20. The method of claim 15 wherein determining the number of iterations through the set of P multimode radix processing chains, determining whether to bypass or activate individual ones the SDF circuits in the multimode radix processing chains, and determining a radix for the multi-radix DFT circuits in the multimode radix processing chains are performed using a lookup table that provides respective control signal settings for a plurality of different transform sizes.

* * * * *